US008582154B2

(12) United States Patent
Uchida

(10) Patent No.: US 8,582,154 B2
(45) Date of Patent: Nov. 12, 2013

(54) IMAGE FORMING APPARATUS, IMAGE FORMING SYSTEM, AND SERVER

(75) Inventor: Yuzuru Uchida, Osaka (JP)

(73) Assignee: KYOCERA Document Solutions Inc. (JP)

( * ) Notice: Subject to any disclaimer, the term of this patent is extended or adjusted under 35 U.S.C. 154(b) by 728 days.

(21) Appl. No.: 12/836,298

(22) Filed: Jul. 14, 2010

(65) Prior Publication Data

US 2011/0013224 A1    Jan. 20, 2011

(30) Foreign Application Priority Data

Jul. 17, 2009    (JP) ................................ 2009-169028

(51) Int. Cl.
 *G06F 3/12*    (2006.01)
(52) U.S. Cl.
 USPC ......................................................... 358/1.15
(58) Field of Classification Search
 USPC .......................................................... 358/1.15
 See application file for complete search history.

(56) References Cited

U.S. PATENT DOCUMENTS

| 2006/0048219 A1* | 3/2006 | Kita ................................. 726/14 |
| 2009/0051545 A1* | 2/2009 | Koblasz ...................... 340/573.1 |
| 2010/0007909 A1* | 1/2010 | Aikens .......................... 358/1.15 |
| 2011/0148576 A1* | 6/2011 | Gupta ........................... 340/5.83 |

FOREIGN PATENT DOCUMENTS

| JP | 2006-163470 | 6/2006 |
| JP | 2006-163903 | 6/2006 |
| JP | 2006-229429 | 8/2006 |

* cited by examiner

*Primary Examiner* — Marivelisse Santiago Cordero
*Assistant Examiner* — Mesfin Getaneh
(74) *Attorney, Agent, or Firm* — McDonnell Boehnen Hulbert & Berghoff LLP

(57) ABSTRACT

An image forming apparatus includes a first image data storage unit that (i) stores user identification information and image data in association with each other, (ii) acquires, upon reception of a leaving signal regarding a specific user from an entering/leaving information management device that manages entering/leaving of a user with respect to an area in which the image forming apparatus is installed, the image data having a security level equal to or higher than a first predetermined level associated with the user identification information of the specific user stored in the first image data storage unit, (iii) saves the acquired image data to a server, and (iv) erases the original image data from the first image data storage unit.

20 Claims, 13 Drawing Sheets

| ROOM ENTERING/LEAVING INFORMATION OF A USER | | SECURITY LEVEL | IMAGE DATA NUMBER |
|---|---|---|---|
| USER ID | ENTERING/LEAVING | | |
| ID001 | ENTERING | HIGH | abc00001 |
| | | HIGH | abc00002 |
| | | LOW | abc00003 |
| | | LOW | abc00004 |
| | | N/A | abc00005 |
| ID002 | ENTERING | HIGH | def00001 |
| | | LOW | def00002 |
| | | N/A | def00003 |

FIG.11A

| ROOM ENTERING/LEAVING INFORMATION OF A USER | | SECURITY LEVEL | IMAGE DATA NUMBER |
|---|---|---|---|
| USER ID | ENTERING/LEAVING | | |
| ID001 | LEAVING | HIGH | |
| | | HIGH | |
| | | LOW | abc00003 |
| | | LOW | abc00004 |
| | | N/A | abc00005 |
| ID002 | ENTERING | HIGH | def00001 |
| | | LOW | def00002 |
| | | N/A | def00003 |

FIG.11B

| USER ID | SECURITY LEVEL | IMAGE DATA NUMBER |
|---------|----------------|-------------------|
| ID001   | HIGH           | abc00001          |
|         | HIGH           | abc00002          |
|         |                |                   |
|         |                |                   |
|         |                |                   |
|         |                |                   |
|         |                |                   |

FIG.13

IMAGE FORMING APPARATUS, IMAGE FORMING SYSTEM, AND SERVER

This application is based on and claims the benefit of priority from the corresponding Japanese Patent Application No. 2009-169028 filed on Jul. 17, 2009, the contents of which are hereby incorporated by reference.

BACKGROUND

1. Field

The present invention relates to an image forming apparatus, an image forming system, and a server, and more particularly, to embodiments of these devices that are optimal for protecting highly secret information.

2. Description of the Related Art

Presently-available image forming apparatuses include a hard disk drive that stores image data read from a scanner and image data transmitted from a host computer via a network, and can store the image data of each user in a folder corresponding thereto by managing folders on a user basis.

It is also possible to prevent the image data from being visually accessed by a third party other than a folder manager by setting a password for the folder.

In general, people will refrain from accessing secret information saved on an image forming apparatus if a manager who has saved that secret information onto the apparatus is also present in the room. However, people may access the information when the manager is absent from the room. Therefore, it is necessary to protect the secret information in the absence of the manager.

There is technology for transferring image data stored in the image forming apparatus' storage means to a server to thereby prevent the possibility that the storage means runs out of memory. There is also technology for encrypting the image data stored in the storage means and saving the image data to the server. However, there is no disclosure of those technologies in terms of protecting secret information stored on the image forming apparatus while the manager is absent from the room.

Alternatively, there is a technology configured to determine when a manager has entered or left a room containing an image forming apparatus; password verification is not required to open a folder when the manager of the folder is present in the room, but is required after the manager leaves the room.

However, the above-mentioned technology is configured to protect the secret information by using a password, and hence a third party who happens to know the password is allowed to have access to the secret information.

SUMMARY

The present disclosure relates to an image forming apparatus, an image forming system, and a server that protect secret information while a manager is absent from a room containing any of these aforementioned devices.

Specifically, an image forming apparatus according to an embodiment includes: a first communication unit that allows a connection to a server via a network; a first image data storage unit that stores user identification information and image data in association with each other; a first transmission image data acquisition unit that acquires, upon reception of a leaving signal regarding a specific user from an entering/leaving information management device that determines whether a user has entered or left an area in which the image forming apparatus is installed, the image data from the first image storage data unit, the image data having a security level equal to or higher than a first predetermined level associated with the user identification information of the specific user, and saves the acquired image data to the server via the first communication unit; an image data erasing unit that erases, after the first transmission image data acquisition unit saves the acquired image data to the server, the original image data that was saved from the first image data storage unit; and a first image data registration unit that stores, when the server receives an entering signal regarding the specific user from the entering/leaving information management device, the image data associated with the user identification information of the specific user received from the server via the first communication unit, in the first image data storage unit.

Additional features and advantages are described herein, and will be apparent from the following Detailed Description and the figures.

BRIEF DESCRIPTION OF THE DRAWINGS

In the accompanying drawings:

FIG. 11A is a diagram illustrating a table stored in a storage unit of the image forming apparatus according to the embodiment;

FIG. 11B is a diagram illustrating a table stored in the storage unit of the image forming apparatus according to the embodiment;

FIG. 13 is a diagram illustrating a table stored in a storage unit of a server according to the embodiment.

DETAILED DESCRIPTION OF THE PREFERRED EMBODIMENT

Hereinafter, description is made of an embodiment with reference to the accompanying drawings.

(Image Forming Apparatus)

Hereinafter, description is made of a basic method for a copy function of an image forming apparatus according to the embodiment. The image forming apparatus according to the embodiment could take the form of, for example, a multifunction peripheral including functions of a printer, a copier, a scanner, and a fax machine.

Figure 1:
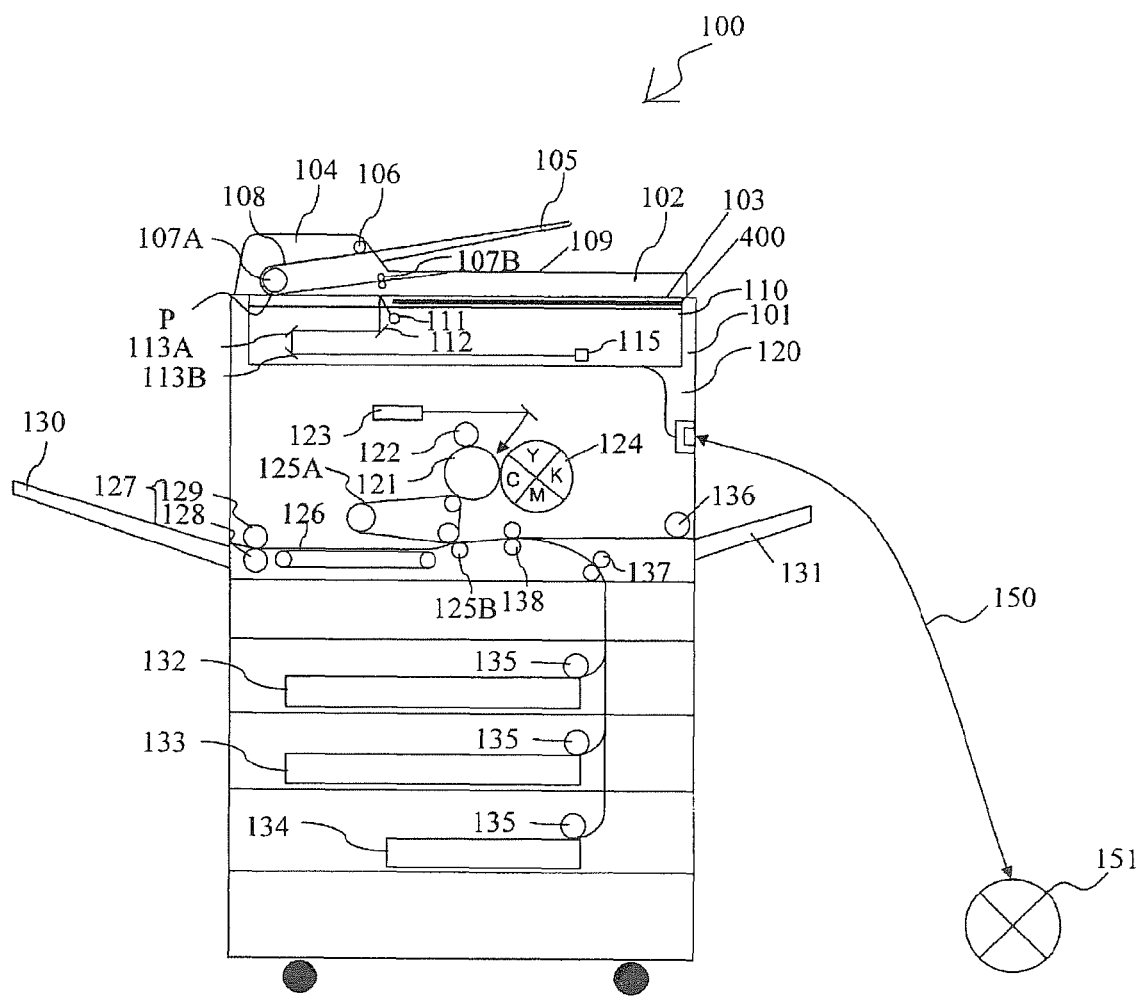
FIG. 1 is a diagram illustrating an overall structure of an image forming apparatus according to an embodiment.

FIG. 1 is a schematic diagram of a multifunction peripheral 100. However, details of each of the units that are not directly related to the present invention are omitted. Note that, as an example, an operation of the image forming apparatus performed when copying a document by using a multifunction peripheral is described briefly.

When a user uses the multifunction peripheral 100 to, for example, print a document, the user places the document on a document table 103 or a placement table 105 illustrated in FIG. 1, and instructs an operation unit 200 (see FIG. 3) provided in the vicinity of the document table 103 to perform the printing. When the instruction is issued, each unit (driver unit) described below is operated to perform the printing.

In other words, as illustrated in FIG. 1, the multifunction peripheral 100 according to this embodiment includes a main body 101 and a platen cover 102 mounted above the main body 101. The document table 103 is provided on an upper surface of the main body 101 and adapted to be opened/closed by the platen cover 102. The platen cover 102 is provided with an automatic document feeder 104, the placement table 105, and a delivery table 109.

Figure 2:
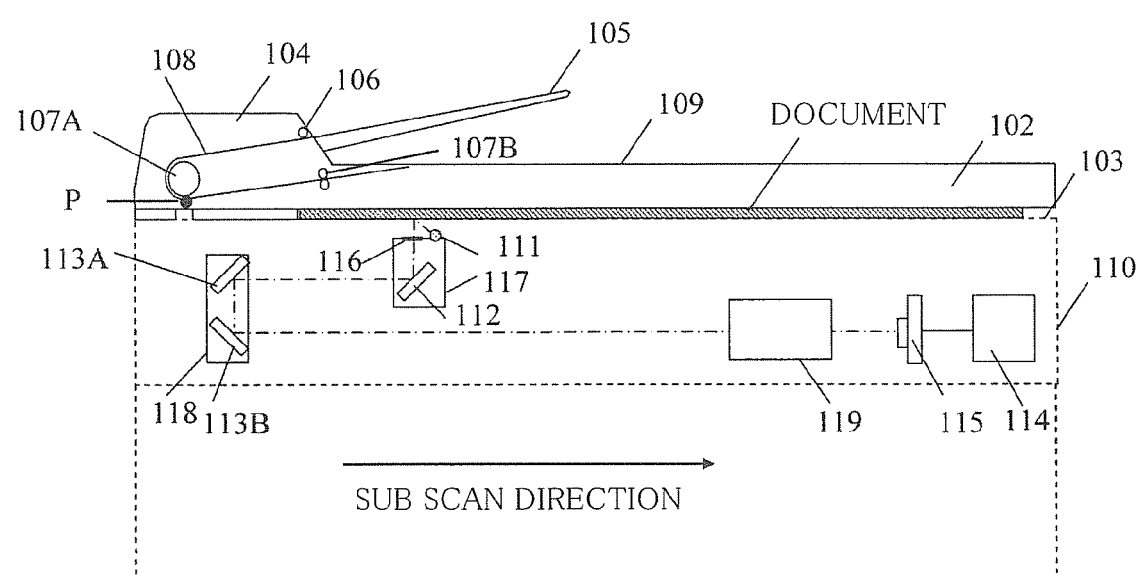
FIG. 2 is a diagram illustrating a structure of a reader unit of the image forming apparatus according to the embodiment.

A reader unit 110 is provided below the document table 103, details of which are illustrated in FIG. 2. The reader unit 110 includes: a first moving carriage 117 including a light source 111 that is long in a main scan direction and which irradiates the document table 103, a slit 116 that selectively passes light from the document table 103, and a mirror 112 that guides the light from the document table 103; a second moving carriage 118 including mirrors 113A and 113B that reflect light reflected from the first moving carriage 117; a lens group 119 that optically corrects the light guided by the mirrors 112, 113A, and 113B; an image pickup element 115 that receives the corrected light from the lens group 119; and an image data generating unit 114.

When the document is read using the automatic document feeder 104, the light source 111 moves to a position at which a reading position P can be irradiated and emits light. The light from the light source 111 is transmitted through the document table 103, reflected by the document passing through the reading position P, and guided to the image pickup element 115 by the slit 116, the mirrors 112, 113A, and 113B, and the lens group 119. The image pickup element 115 converts the received light into the electric signal and transmits the electric signal to the image data generating unit 114. In the image data generating unit 114, the light received by the image pickup element 115 is input as an analog electric signal of red (R), green (G), and blue (B), and digitized. In addition, the image data generating unit 114 sets converted digital signals as respective data units, and performs correction, modification, and the like on those data units to generate image data formed by a plurality of data units.

Further, when the reader unit 110 reads the document placed on the document table 103, the first moving carriage 117 moves in a sub scan direction while emitting light from the light source 111. In order to keep a fixed optical path length from the light source 111 to the image pickup element 115, the second moving carriage 118 moves in the direction toward the image pickup element 115 at a half speed of the first moving carriage 117.

Based on the light guided by the mirrors 112, 113A, and 113B, the image pickup element 115 converts the light from the document placed on the document table 103 into the electric signal, and the image data generating unit 114 generates the image data based on the electric signal.

Provided below the reader unit 110 of the main body 101 is a printing unit 120 that prints the image data. Examples of an image that can be printed by the printing unit 120 include image data generated by the image data generating unit 114 as described above, and image data transmitted from a network 151 via a communication cable 150 connected to the multifunction peripheral 100 along with an instruction to print the image.

An electrophotographic process is used for a printing method employed by the printing unit 120. In other words, the printing unit 120 employs a printing method in which a photosensitive drum 121 is charged uniformly by a charger 122. The photosensitive drum 121 is then irradiated by a laser 123 to form a latent image on the photosensitive drum 121, toner is caused to adhere to the latent image by a developing device 124 to form a visible image, and the visible image is transferred onto a paper sheet via an intermediate transfer belt 125A by action of a transfer roller 125B.

The paper sheet on which the visible image is to be printed is placed on a sheet feeding tray such as a manual feed tray 131 or a sheet feeding cassette 132, 133, or 134.

When the printing unit 120 prints a document, one paper sheet is pulled out from one of the sheet feeding trays by using a pickup roller 135, and the pulled-out paper sheet is fed between the intermediate transfer belt 125A and the transfer roller 125B by transportation rollers 137 and registration rollers 138. The pulling out of the paper sheet may be performed by pulling out the paper sheet from the manual feed tray 131 by using the pickup roller 136 for a manual feed tray.

After the visible image on the intermediate transfer belt 125A is transferred onto the paper sheet fed between the intermediate transfer belt 125A and the transfer roller 125B, the printing unit 120 causes a transfer belt 126 to transport the paper sheet to a fixing device 127 in order to fix the visible image. The fixing device 127 includes a heat roller 129 into which a heater is built and a pressure roller 128 abutted against the heat roller 129 with a predetermined pressure. When the paper sheet is passed between the heat roller 129 and the pressure roller 128, the visible image is fixed onto the paper sheet by heat with a pressure force exerted on the paper sheet. The printing unit 120 delivers the paper sheet that has passed the fixing device 127 to a delivery tray 130.

The above-mentioned method is the basic method for the copy function for the multifunction peripheral 100. Note that the multifunction peripheral 100 causes the above-mentioned respective units (reader unit 110 and the printing unit 120) to cooperate appropriately, thereby providing a user with other functions such as a facsimile transmission/reception function, a printing function, a scanning function, a post-processing function, and a memory function.

Figure 3:
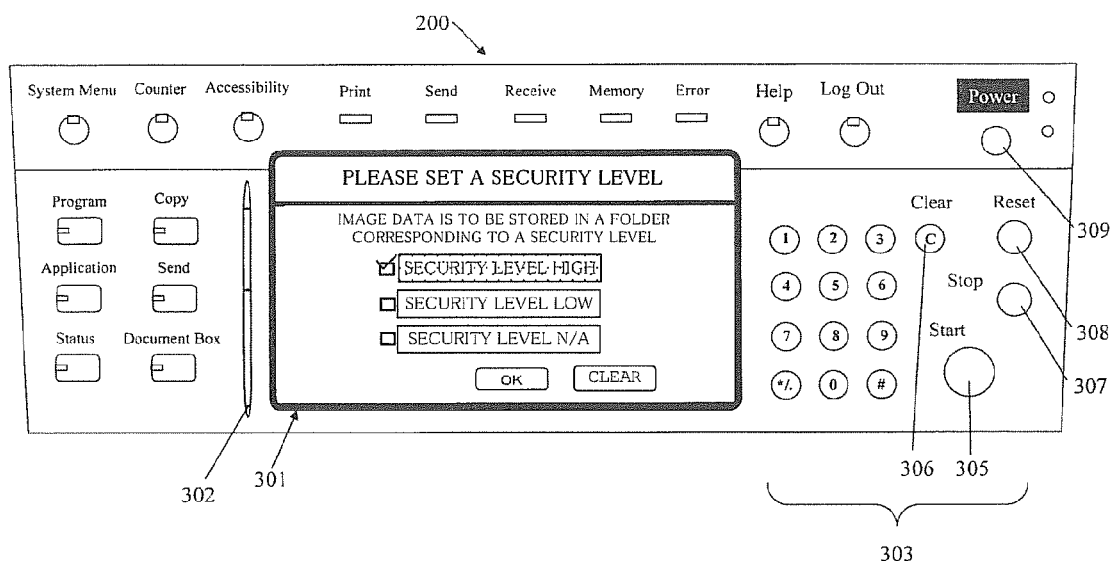
FIG. 3 is a diagram illustrating an operation unit of the image forming apparatus according to the embodiment.

FIG. 3 is a diagram illustrating an example of an external appearance of the operation unit 200 provided by the multifunction peripheral 100. The user uses the operation unit 200 to input setting conditions or the like involved in providing the above-mentioned functions. The operation unit 200 includes a touch panel 301, a touch pen 302, and operation keys 303, which are used to input the setting conditions, to execute the respective functions, and the like.

Figure 4:
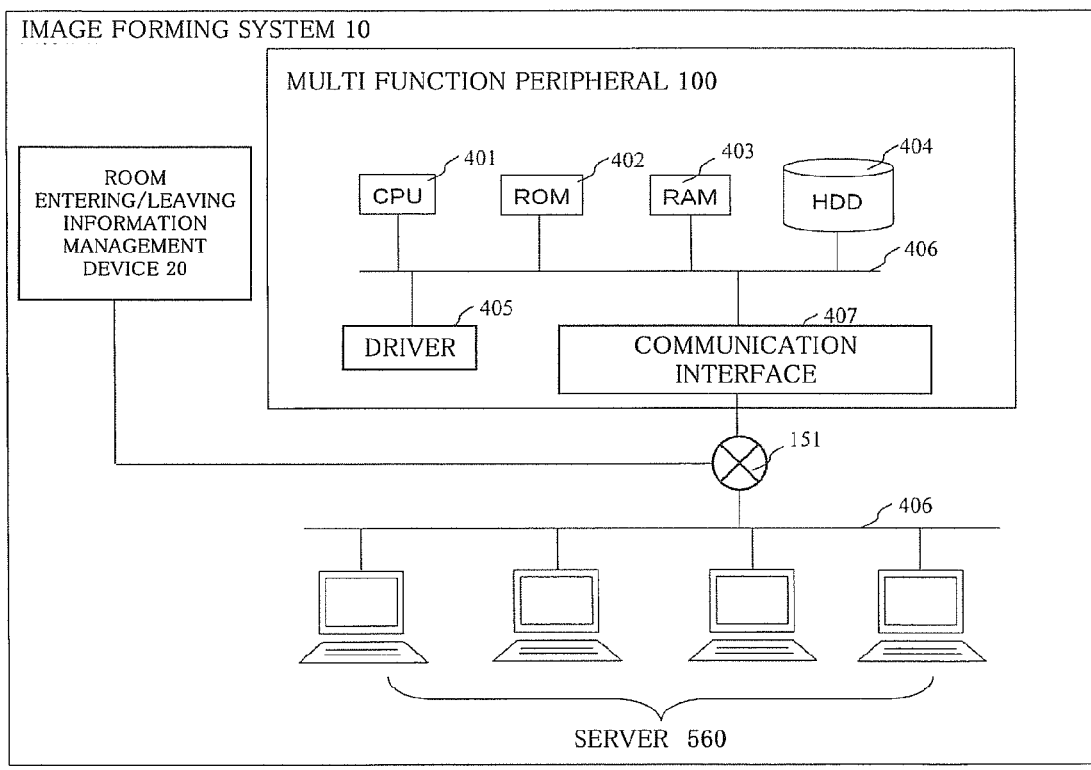
FIG. 4 is a diagram illustrating a hardware configuration of a control system for an image forming system according to the embodiment.

Described next, with reference to FIG. 4, is a hardware configuration of a control system for an image forming system 10 (a system that connects the multifunction peripheral 100, a server 560, and a room entering/leaving information management device 20 to one another via a network). FIG. 4 illustrates a schematic configuration of the control system hardware for the multifunction peripheral 100, the room entering/leaving information management device 20, and the server 560, the combination of which constitute the image forming system 10. However, details of each of the units that are not directly related to the present invention are omitted.

First, a control circuit of the multifunction peripheral 100 connects a central processing unit (CPU) 401, a read only memory (ROM) 402, a random access memory (RAM) 403, a hard disk drive (HDD) 404, a driver 405 corresponding to each driver unit, and a communication interface 407 to one another by an internal bus 406. The CPU 401, for example, uses the RAM 403 as a working area, executes programs stored in the ROM 402, the HDD 404, and the like, exchanges data and instructions from the operation unit 200 with the driver 405 based on the execution results, and controls the operations of the respective driver units and the like illustrated in FIGS. 1 and 2. The multifunction peripheral 100 can be connected to the network 151 via the communication interface 407. The CPU 401 of the multifunction peripheral 100 exchanges data with the server 560 and the room entering/leaving information management device 20 connected to the network 151 via the communication interface 407.

Further, the server 560 according to the embodiment of the present invention includes a CPU, a ROM, a RAM, an HDD, a driver corresponding to each driver unit, and a communication interface in the same manner as the multifunction peripheral 100. Further, the CPU executes a program to thereby implement each of the units described later illustrated in FIG. 5. The server 560 can be connected to the network 151 via the communication interface. The CPU 401 of the server 560 exchanges data with the multifunction peripheral 100 and the room entering/leaving information management device 20 connected to the network 151 via the communication interface.

Further, the room entering/leaving information management device 20 that can be connected to the network similarly includes a CPU, a ROM, a RAM, an HDD, a driver corresponding to each driver unit, and a communication interface in the same manner as the multifunction peripheral 100. The CPU executes a program to thereby implement each of the units described later. A storage unit such as the ROM of the room entering/leaving information management device 20 prestores a user ID used for permitting a user corresponding thereto to enter a room. When the permitted user is detected entering or leaving the room by authenticating an IC card, the CPU of the room entering/leaving information management device 20 exchanges data with the server 560 and the multifunction peripheral 100 connected to the network via the communication interface.

(Security Setting Processing)

Figure 5:
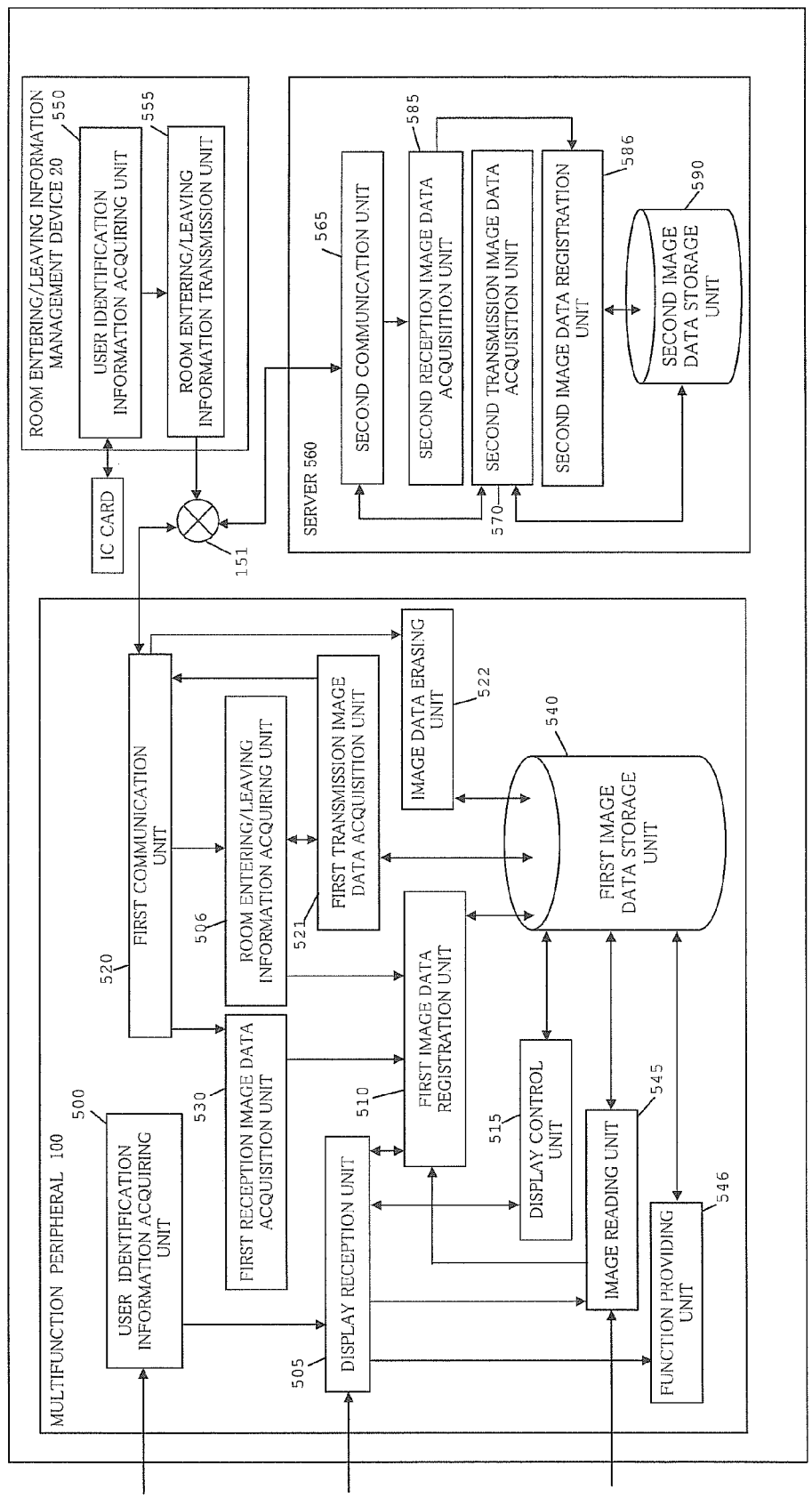
FIG. 5 is a functional block diagram of the image forming system according to the embodiment.

Described next is a security setting method performed in the image forming apparatus on the image data according to the embodiment of the present invention with reference to the accompanying drawings. FIG. 5 is a functional block diagram of the image forming system 10, and FIGS. 6 to 9 are flowcharts illustrating a method for setting security. Note that the letter "S", prefixed to several numerals in the flowcharts, is used to indicate a "Step".

First, in order to use the multifunction peripheral 100, a user A inserts an IC card possessed by a user A into a card reader unit provided to the multifunction peripheral 100. Then, a user identification information acquiring unit 500 acquires the user ID (for example, "ID001"), which is user identification information capable of uniquely identifying the user that is stored in the inserted card, and authenticates the user A (if YES in S101 of FIG. 6), and the user A becomes able to use the multifunction peripheral 100. Note that, as a method for authentication described above, the IC card may be brought into contact with the card reader unit, or a non-contact method may be employed.

If the user ID of the user A is thus acquired, the user identification information acquiring unit 500 notifies a display reception unit 505 of the acquired user ID. Then, the display reception unit 505 causes an initial screen 1000 (here, copy setting screen illustrated in FIG. 10A) to be displayed on the touch panel 200 (S102 of FIG. 6).

Figure 10A:
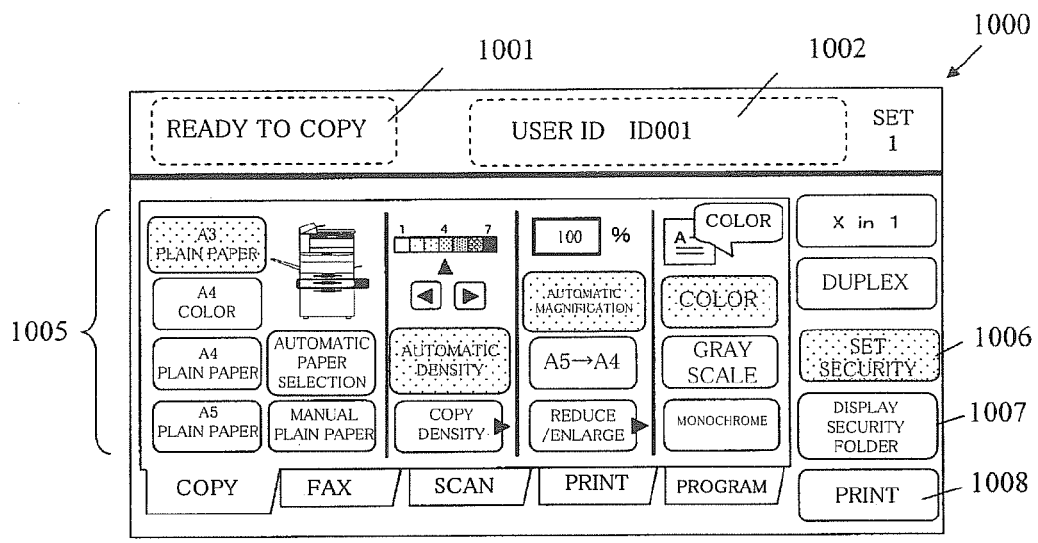
FIG. 10A is a diagram illustrating a screen displayed on the operation unit of the image forming apparatus according to the embodiment.

Displayed on the initial screen 1000 are, as illustrated in FIG. 10A, a message 1001 reading "Ready to copy", an indication 1002 of the user ID "ID001", a plurality of items 1005 related to the copy function, a "Print" item 1008, a "Set security" item 1006 described later, and a "Display security folder" item 1007. By depressing necessary items of the items 1005, it becomes possible to input the settings of a series of operations related to the copy function. Note that if one of the plurality of items 1005 is depressed, the display reception unit 505 changes a background color of the depressed item from white to gray. The user A uses the respective keys provided by the operation unit 200 to input the settings of the necessary items with respect to the initial screen 1000.

Figure 10B:
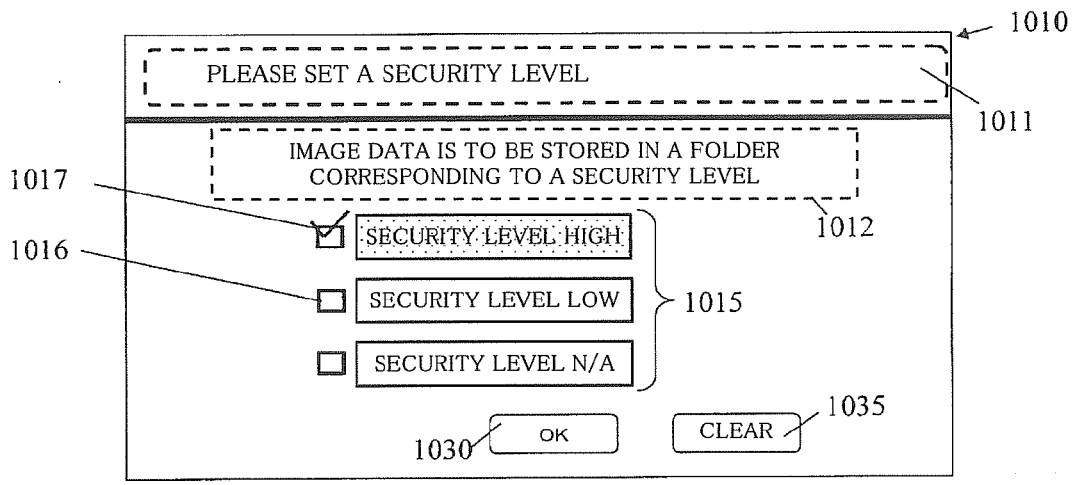
FIG. 10B is a diagram illustrating a screen displayed on the operation unit of the image forming apparatus according to the embodiment.

When the user A who wishes to perform registration of the image data and the security setting depresses the "Set security" item 1006 with respect to the initial screen 1000 (if YES in S103 of FIG. 6), the display reception unit 505 receives the input and notifies a first image data registration unit 510 that a screen used for receiving the security setting for the image data is to be displayed. In response thereto, as illustrated in FIG. 10B, the first image data registration unit 510 displays a security image data registration screen 1010 capable of setting the security for the image data (S104 of FIG. 6).

Displayed on the security image data registration screen 1010 are a message 1011 that prompts the user to set the security for the image data, a message 1012 indicating that the image data is to be stored in a folder (security folder) corresponding to a security level, security setting items 1015, an "OK" key 1030, and a "Clear" key 1035. Displayed as the security setting item 1015 are an item of "Security level: High", an item of "Security level: Low", and an item of "Security setting: N/A".

Each user's folder contains subfolders (security folders) corresponding to each of the above-mentioned security levels. The security folders are configured in such a manner that, when the security of the image data is set, the read image data is automatically stored in the security folder corresponding to the security level set by the user. If "Security setting: N/A" is selected, the security setting is not performed, and the read image data is stored in the security folder corresponding to security being unavailable.

In addition, a select box 1016 is displayed in the vicinity of the displayed security setting item 1015 for each of the security setting items.

When the user A depresses the select box 1016 corresponding to the displayed security setting item 1015 with respect to the security image data registration screen 1010, the first image data registration unit 510 displays a selected checkmark 1017 in the select box 1016, and changes the background color of the depressed security setting item 1015 from white to gray. Here, if the "Clear" key 1035 is depressed, the first image data registration unit 510 clears the selected checkmark 1017 from the select box 1016, and displays the above-mentioned selected security setting item 1015 with a background color of white.

When the user A selects, for example, "Security level: High" as the security level and depresses the "OK" key 1030, the first image data registration unit 510 receives the setting of the security level (S105 of FIG. 6), and notifies the display reception unit 505 that the security image data registration screen 1010 is switched to a screen capable of performing an output such as printing.

Figure 6:
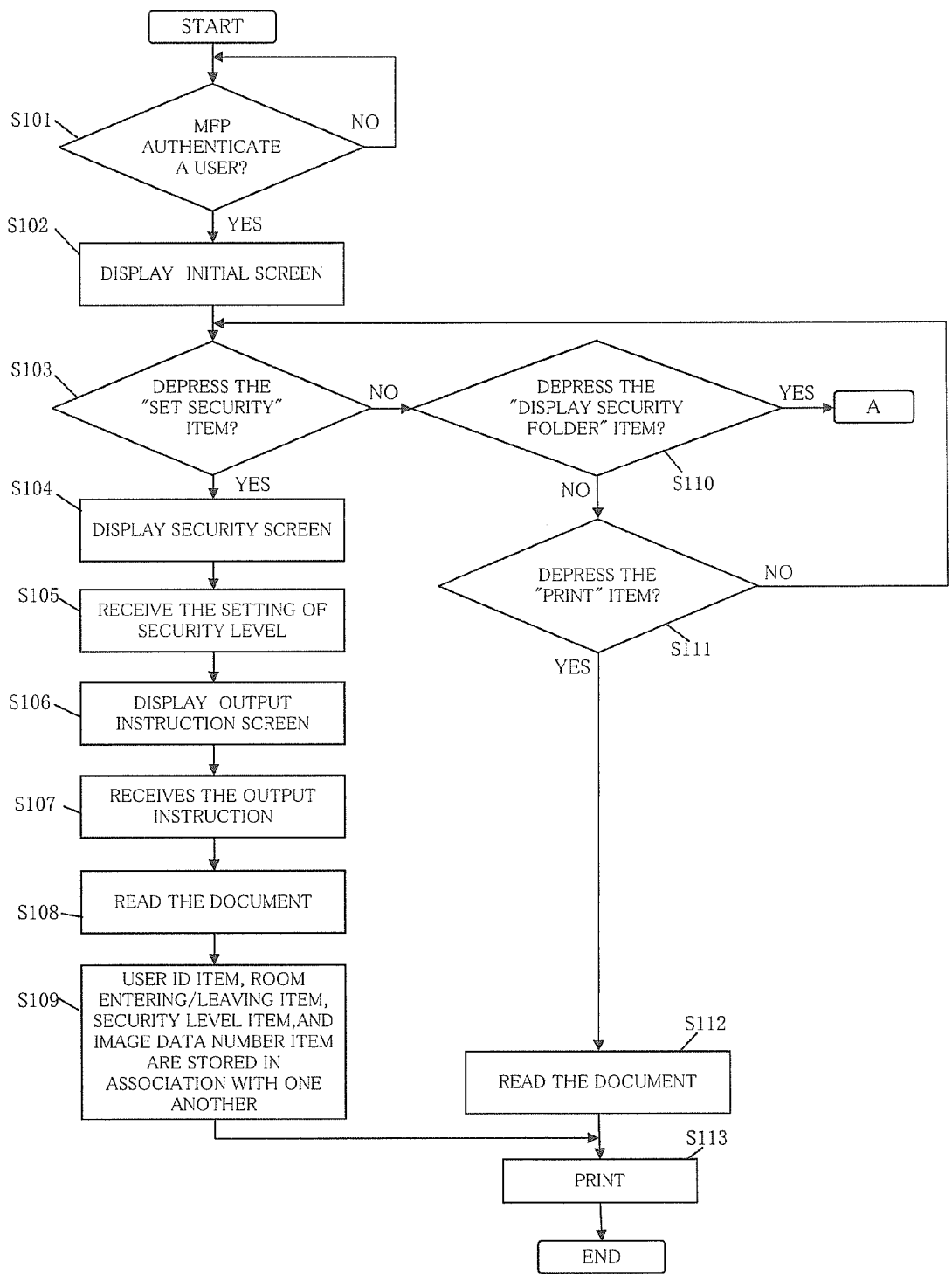
FIG. 6 is a flowchart of a method for setting the security of image data on the image forming apparatus according to the embodiment.
Figure 10C:
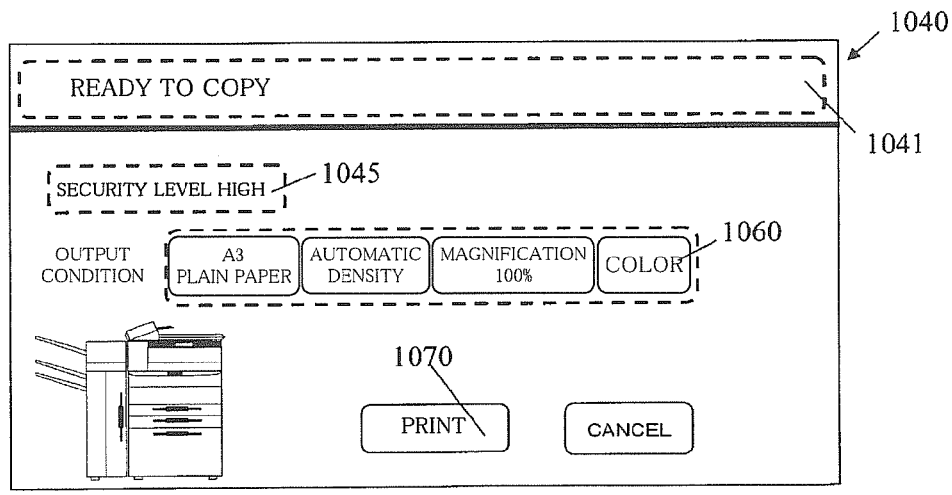
FIG. 10C is a diagram illustrating a screen displayed on the operation unit of the image forming apparatus according to the embodiment.

In response thereto, the display reception unit 505 switches from displaying the security image data registration screen 1010 to displaying an output instruction screen 1040 as illustrated in FIG. 10C (S106 of FIG. 6).

Displayed on the output instruction screen 1040 are the message 1045 ("Security level: High" in this embodiment) that indicates the security level, "Output condition" items 1060, a "Print" button 1070, and a "CANCEL" button. Contents of the "Output condition" items 1060 are the same as the items selected through the initial screen 1000 of FIG. 10A.

When the user A places the document and depresses the "Print" button 1070 with respect to the output instruction screen 1040, an image reading unit 545 receives the instruction (S107 of FIG. 6) and reads the document (S108 of FIG. 6). Then, the image reading unit 545 notifies the first image data registration unit 510 that the document has been read.

Here, in the case where the security is set as described above, the first image data registration unit 510 stores the image data read by the image reading unit 545, along with the associated security level, in a first image data storage unit 540 (S109 of FIG. 6).

For example, the first image data registration unit 510 stores an image data number of image data to be secured in a security level specific image data table 1100 (see FIG. 11A) stored in the first image data storage unit 540. Stored in the security level specific image data table 1100 (in association with one another) are a user ID item 1110 that is room entering/leaving information of a user as described later, a room entering/leaving item 1120 that is another room entering/leaving information of the user, a security level item 1130, and an image data number item 1140 of the image data read by the image reading unit 545. Note that the image data corresponding to the image data number is stored in the first image data storage unit 540, and a first transmission image data acquisition unit 521 described later can reference the image data number to thereby acquire the corresponding image data.

When the image data is thus stored in the first image data storage unit 540, a function providing unit 546 executes a printing process (S113 of FIG. 6). When the printing process is finished, and after a certain amount of time has passed, the user identification information acquiring unit 500 cancels the authentication of the user A with respect to the multifunction peripheral 100.

Note that it is also naturally possible to skip the security setting. This means that the image data is not to be stored in the security folder, and is different from selecting the item of "Security setting: N/A" on the security image data registration screen 1010. In this case, the image data is subjected to image forming without being stored in the security folder. In that case, by depression of the "Print" item 1008 without depression of the "Set security" item 1006 or the "Display security folder" item 1007 on the initial screen 1000 (if NO in S103→NO in S110→YES in S111 of FIG. 6), the image reading unit 545 reads the document in response thereto (S112 of FIG. 6), and the function providing unit 546 prints the read document (S113 of FIG. 6).

(User's Room Entering/Leaving Processing)

Next, description is made of a method performed in a case where the room entering/leaving information management device 20 senses a room entering/leaving signal indicating that the user A who sets the security for the image data enters or leaves an area in which the multifunction peripheral 100 is installed. Here, the area in which the multifunction peripheral 100 is installed represents, for example, a floor or a space formed on the floor of a building or the like, and the room entering/leaving information management device 20 is provided at an entrance to the area. In this embodiment, the area is assumed to be a room, but the area is not limited to a room.

First, after the user A sets the security of the image data using the multifunction peripheral 100, in a case where the user A is about to leave the above-mentioned area, the user A inserts the IC card possessed by the user A into the card reader unit provided by the room entering/leaving information management device 20 located at the entrance of the room. Then, a user identification information acquiring unit 550 of the room entering/leaving information management device 20 acquires the user ID ("ID001") stored in the inserted IC card, and cancels the authentication of the user A (i.e., confirms that user A is leaving the room) (S301 of FIG. 8). Note that when the user A enters the above-mentioned area, the room entering/leaving information management device 20 confirms that user A is entering the room (authenticates the user ID).

Subsequently, a lock opening/closing unit (not shown) opens a lock to the entrance for a certain period of time, allows the user A to leave, and then closes the lock to the entrance. Note that the room entering/leaving information management device 20 may be provided with a sensor that confirms that user A has passed by the device.

When the user identification information acquiring unit 550 of the room entering/leaving information management device 20 confirms that user A has left the room, the user identification information acquiring unit 550 notifies a room entering/leaving information transmission unit 555 that the user A has left the room. In response thereto, the room entering/leaving information transmission unit 555 notifies the multifunction peripheral 100 of the room leaving signal of the user and the identification information of the user, which is included in user's room leaving information (S302 of FIG. 8).

Then, a room entering/leaving information acquiring unit 506 provided to the multifunction peripheral 100 acquires the user's room leaving information via a first communication unit 520 (S303 of FIG. 8), and notifies the first image data registration unit 510 that the user's room leaving information has been acquired. In response thereto, the first image data registration unit 510 references the security level specific image data table 1100 of the first image data storage unit 540 to change a room entering/leaving item 1121, which is associated with the user ID included in the user's room leaving information, from "Entered" to "Left" (S304 of FIG. 8).

When the room entering/leaving information acquiring unit 506 acquires the user's room leaving information, the room entering/leaving information acquiring unit 506 notifies the first transmission image data acquisition unit 521 that the user's room leaving information has been acquired. In response thereto, the first transmission image data acquisition unit 521 references the security level specific image data table 1100 of the first image data storage unit 540 to judge whether or not there exists any image data number for which the security is set among the image data numbers associated with the user ID included in the user's room leaving information (S305 of FIG. 8). Note that it is judged that no security is set for the image data number associated with a security level of "N/A".

Figure 8:
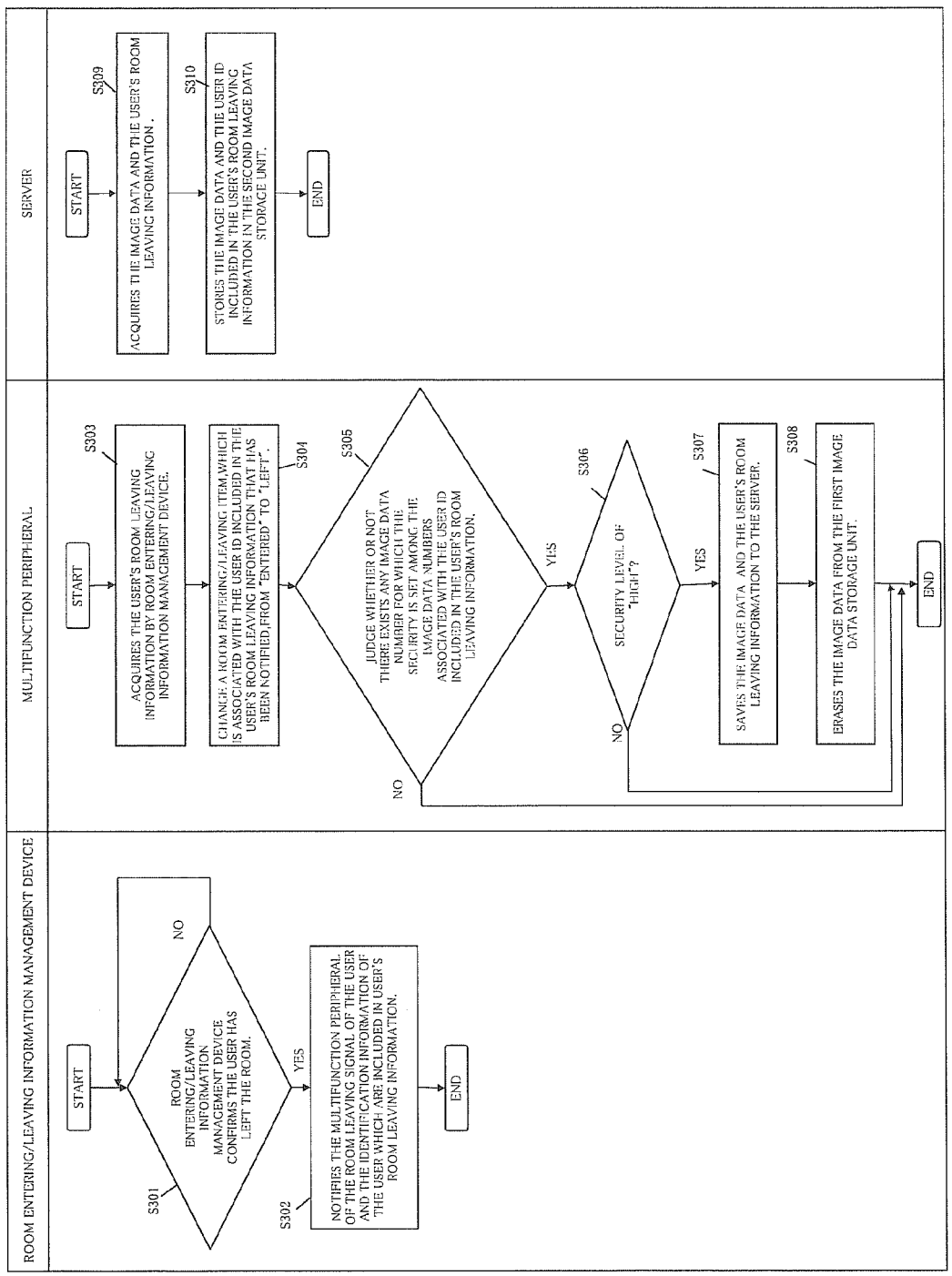
FIG. 8 is a flowchart of a method performed when a user leaves a room.

Here, if there exists an image data number for which the security is set (if YES in S305 of FIG. 8), the first transmission image data acquisition unit 521 judges whether or not the security level associated with the image data number is a security level of "High", which is equal to or higher than a first predetermined level (S306 of FIG. 8).

Here, if the security level is a security level of "High", which is equal to or higher than the first predetermined level (if YES in S306 of FIG. 8), the first transmission image data acquisition unit 521 acquires all the image data corresponding to the image data numbers having the security level of "High" associated with the user ID. Then, the first transmission image data acquisition unit 521 notifies the first communication unit 520 that the acquired image data is to be transmitted to the server 560 along with the user's room leaving information.

In this embodiment, the first transmission image data acquisition unit 521 notifies the first communication unit 520 that the user's room leaving information, including "ID001", which is the user ID of the user A, and the image data corresponding to an image data number item 1141 associated with the security level of "High", are to be transmitted to the server 560. In response thereto, the first communication unit 520 saves the image data and the user's room leaving information to the server 560 (S307 of FIG. 8).

Then, when the first communication unit 520 saves the image data to the server 560, an image data erasing unit 522 erases the image data from the first image data storage unit 540 (S308 of FIG. 8).

As illustrated in FIG. 11B, the image data number item 1141 within the security level specific image data table 1100 illustrated in FIG. 11A is not displayed in FIG. 11B. This indicates that the image data corresponding to the image data number item 1141 has been erased. Note that the same image data number is employed by both the multifunction peripheral 100 and the server 560.

Meanwhile, if the first transmission image data acquisition unit 521 judges that there exists no image data number for which the security is set among the image data numbers associated with the user ID included in the user's room leaving information (if NO in S305 of FIG. 8), or if the security level associated with the image data number is not "High" (is not the security level equal to or higher than the first predetermined level) (if NO in S306 of FIG. 8), then the method of the multifunction peripheral 100 ends without transmitting the image data and the user's room leaving information to the server 560.

When the image data and the user's room leaving information corresponding thereto are transmitted from the multifunction peripheral 100, a second reception image data acquisition unit 585 provided to the server 560 acquires the image data and the user's room leaving information via a second communication unit 565 (S309 of FIG. 8), and notifies a second image data registration unit 586 that the acquired image data is to be stored in a second image data storage unit 590 of the server 560.

Then, the second image data registration unit 586 stores the image data and the user ID included in the user's room leaving information in the second image data storage unit 590 of the server 560 in association with each other (S310 of FIG. 8→End).

For example, the second image data storage unit 590 of the server 560 stores the user ID item 1110, the security level item 1130, and the image data number item 1141 in such an image data table 1300 as illustrated in FIG. 13 in association with one another. Note that the image data corresponding to the image data number is stored in the second image data storage unit 590 of the server 560, and a second transmission image data acquisition unit 570 of the server 560 (described later) can reference the image data number to thereby acquire the corresponding image data.

Subsequently, if the user A (who has set the security of image data) desires to enter the area, the user A inserts the IC card possessed by the user A into the card reader unit provided to the room entering/leaving information management device 20 at the entrance. Then, the user identification information acquiring unit 550 of the room entering/leaving information management device 20 acquires the user ID ("ID001") that is the user identification information stored in the inserted card, and authenticates the user (confirms that user A is entering the room) (if YES in S401 of FIG. 9). Then, the lock opening/closing unit opens the lock to the entrance, allows the user A to enter, and after a certain amount of time has passed, closes the lock to the entrance. Note that the room entering/leaving information management device 20 may be provided with the sensor that confirms that user A has passed by the device.

When the user identification information acquiring unit 550 of the room entering/leaving information management device 20 thus confirms that user A has entered the room, the user identification information acquiring unit 550 notifies the room entering/leaving information transmission unit 555 that the user A has entered the room. In response thereto, the room entering/leaving information transmission unit 555 transmits to the server 560 a room entering signal of the user and the identification information of the user, which are user's room entering information (S402 of FIG. 9).

Figure 9:
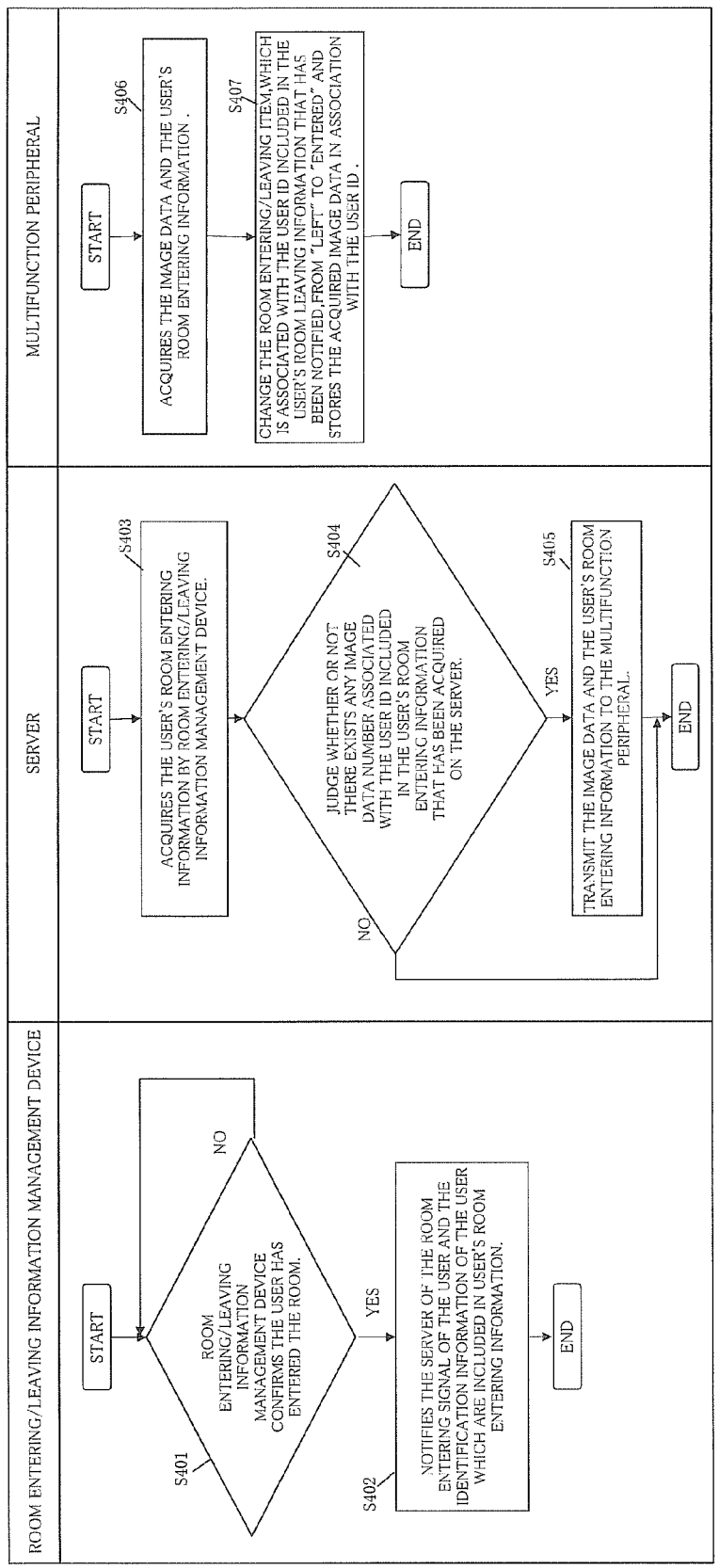
FIG. 9 is a flowchart of a method performed when the user enters the room.

When the user's room entering information is transmitted to the server 560, the second transmission image data acquisition unit 570 provided to the server 560 acquires the user's room entering information via the second communication unit 565 (S403 of FIG. 9).

The second transmission image data acquisition unit 570 that has acquired the user's room entering information references the image data table 1300 of the second image data storage unit 590 of the server 560. Then, the second transmission image data acquisition unit 570 judges whether or not there exists any image data number associated with the user ID included in the user's room entering information that has been acquired on the server 560 (S404 of FIG. 9).

Here, if there exists any image data number associated with the user ID included in the user's room entering information (if YES in S404 of FIG. 9), the second transmission image data acquisition unit 570 of the server 560 acquires the image data corresponding to the image data number from the second image data storage unit 590 of the server 560. Then, the second transmission image data acquisition unit 570 notifies the second communication unit 565 of the server 560 that the acquired image data and the user's room entering information are to be transmitted to the multifunction peripheral 100. In response thereto, the second communication unit 565 transmits the image data and the user's room entering information to the multifunction peripheral 100 (S405 of FIG. 9).

In this embodiment, the second transmission image data acquisition unit 570 of the server 560 acquires the image data corresponding to the image data number item 1141 associated with "ID001", which is the user ID of the user A from the second image data storage unit 590 of the server 560. Then, the second communication unit 565 of the server 560 transmits the image data and the user's room entering information, including information reflecting the fact that the user has entered the room and the user ID "ID001", to the multifunction peripheral 100.

Meanwhile, if the second transmission image data acquisition unit 570 of the server 560 judges that there exists no image data number associated with the user ID included in the user's room entering information on the server 560 (if NO in S404 of FIG. 9), the method of the server 560 ends without transmitting the image data and the user's room entering information to the multifunction peripheral 100.

When the image data and the user's room entering information are thus transmitted from the server 560, the room entering/leaving information acquiring unit 506 provided to the multifunction peripheral 100 acquires the user's room entering information via the first communication unit 520, and notifies the first image data registration unit 510 that the user's room entering information has been acquired. Further, a first reception image data acquisition unit 530 acquires the image data via the first communication unit 520. The first reception image data acquisition unit 530 notifies the first image data registration unit 510 that the image data has been acquired (S406 of FIG. 9).

In response thereto, the first image data registration unit 510 references the security level specific image data table 1100 of the first image data storage unit 540 to change the room entering/leaving item 1121, which is associated with the user ID included in the user's room leaving information, from "Left" to "Entered".

Further, the first image data registration unit 510 stores the acquired image data in association with the user ID corresponding thereto in the security level specific image data table 1100 of the first image data storage unit 540 (S407 of FIG. 9).

Accordingly, while the user is absent from the area in which the image forming apparatus is installed, the image data stored in the first image data storage unit 540 can be saved to a server, and hence it becomes possible to fully protect highly secret information from a third party.

(Displaying of Security Folder)

Described next is a method of displaying the image data for which the security is set on the multifunction peripheral 100. In this embodiment, in addition to the user A ("ID001"), at least a user B ("ID002") can enter/leave the area in which the multifunction peripheral 100 is installed, and it is assumed that, for example, the user B is present in the room after the user A leaves the room.

Further, the display reception unit 505 of the multifunction peripheral 100 may display the image data stored in the first image data storage unit 540 of the multifunction peripheral 100 but not the image data saved to the server 560. Hereinafter, the method is described starting from a state in which the display reception unit 505 is displaying the initial screen 1000 after the multifunction peripheral 100 authenticates the user.

First, if the user B depresses the "Display security folder" item 1007 provided on the initial screen 1000 of the multifunction peripheral 100 (if NO in S103→YES in S110→A of FIG. 6), the display reception unit 505 receives the input and notifies a display control unit 515 that the "Display security folder" item 1007 has been depressed. In response thereto, the display control unit 515 references the security level specific image data table 1100 to determine whether the room entering/leaving item 1120 associated with each user ID is "Entered" or "Left" (A→S201→S202 of FIG. 7).

Here, if the room entering/leaving item 1120 associated with one user ID is "Entered", the display control unit 515 notifies the display reception unit 505 that all the image data corresponding to the image data numbers associated with the one user ID are to be displayed. In response thereto, the display reception unit 505 displays all the image data corresponding to the image data numbers associated with the user ID (S203 of FIG. 7).

For example, the display reception unit 505 switches the initial screen 1000 to a security folder screen 1200 that displays the security folder in which the image data is stored.

Figure 12A:
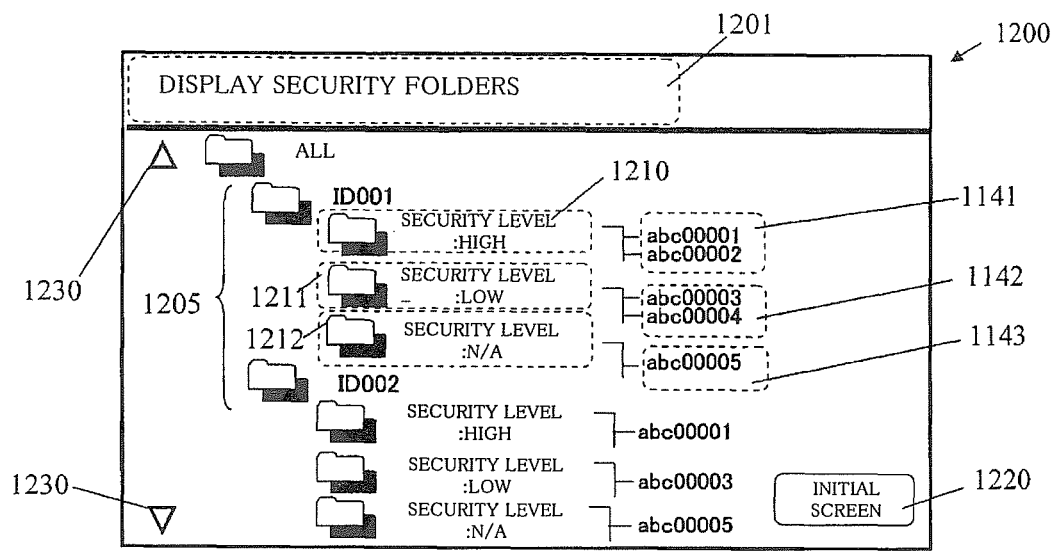
FIG. 12A is a diagram illustrating a screen displayed on the operation unit of the image forming apparatus according to the embodiment.

FIG. 12A illustrates an example of the security folder screen 1200 while the user A is present in the area. Displayed on the security folder screen 1200 are a message 1201 indicating that the security folders are displayed, user folders 1205 that are provided on a user ID basis, and an "Initial screen" item 1220. Then, the security folders provided on a security level basis are stored as the user folders 1205, and the image data associated with the respective security levels is stored in the security folder.

That is, the image data corresponding to the image data number item 1141 associated with "Security level: High" is stored in a "Security level: High" folder 1210, and the image data corresponding to the image data number 1142 associated with "Security level: Low" is stored in a "Security level: Low" folder 1211. The image data corresponding to an image data number 1143 associated with the security level of "N/A" (i.e., image data for which the security is not set) is stored in a "Security setting: N/A" folder 1212.

In the case of displaying the image data, if the image data number to be displayed is depressed after one of the corresponding folders is depressed, the display reception unit 505 receives the input and displays the image data corresponding to the depressed image data number. Note that such a configuration may be employed to execute password verification when displaying the image data.

Further, if all of the user folders cannot be displayed on the touch panel 301, a switch button 1230 may be depressed to thereby cause the display reception unit 505 to display the hidden user folders by switching from the currently-displayed user folders 1205. In this case, if there exists no hidden user folder, the contour of the switch button 1230 may be displayed by a broken line instead of a solid line, and the display reception unit 505 may not accept the selection of the switch button 1230. Further, when the "Initial screen" item 1220 is depressed, the display reception unit 505 naturally switches from the security folder screen 1200 to the initial screen 1000.

Figure 7:
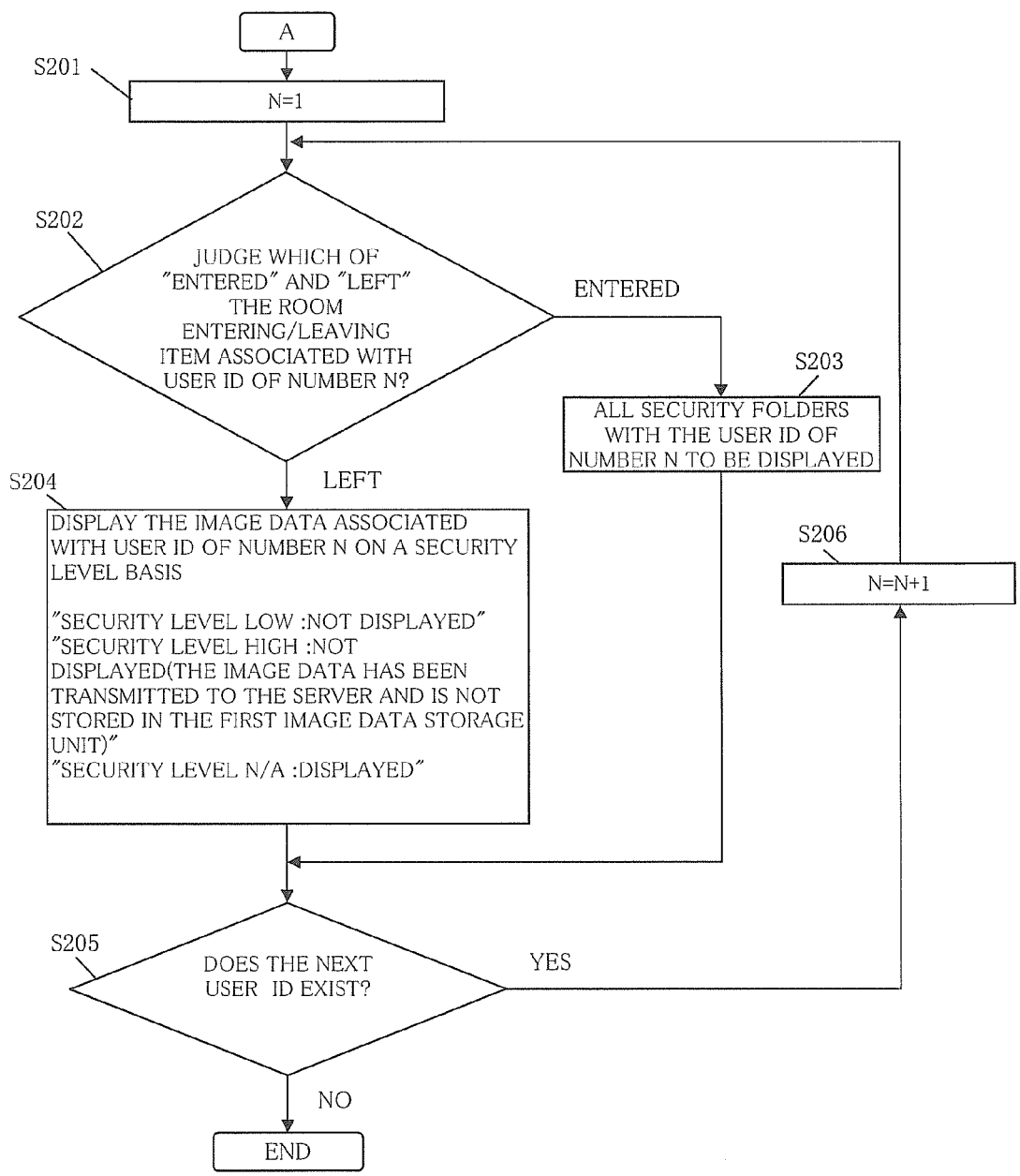
FIG. 7 is a flowchart of a method for displaying the image data of the image forming apparatus according to the embodiment.

Meanwhile, if the display control unit 515 references the security level specific image data table 1100 to judge that the room entering/leaving item 1120 associated with a user ID is "Left", the display control unit 515 controls the display reception unit 505 to execute a display method for the image data corresponding to the image data number associated with the user ID, the display method being different on a security level basis (S204 of FIG. 7).

First, the display control unit 515 controls the display reception unit 505 so as not to display the image data having a security level equal to or lower than a second predetermined level (for example, "Security level: Low"). Note that the display control unit 515 controls the display reception unit 505 to display the image data with "Security level: N/A" without judging that the security level of the image data is equal to or lower than the second predetermined level.

For example, the display control unit 515 controls the display reception unit 505 to perform a known masking process on the "Security level: Low" folder 1211 that stores the image data associated with "Security level: Low" of the folders storing the image data associated with the user ID in the user's room leaving information. That is, of "ID001" folders illustrated in FIG. 12A, a folder 1211 with "Security level: Low" is not displayed in FIG. 12B (is subjected to the masking process).

Here, the masking process represents a process for hiding a folder itself while the image data within a folder is nevertheless stored in the first image data storage unit 540, thereby preventing a third party from visually accessing the image data within the folder.

Accordingly, it is possible to prevent the third party from visually accessing secret information without the need to save the information to the server.

Next, of the image data with the room entering/leaving item 1120 being associated with "Left", the image data with "Security level: High" is not stored in the first image data storage unit 540 of the multifunction peripheral 100, and hence the display reception unit 505 cannot display the image data.

Figure 12B:
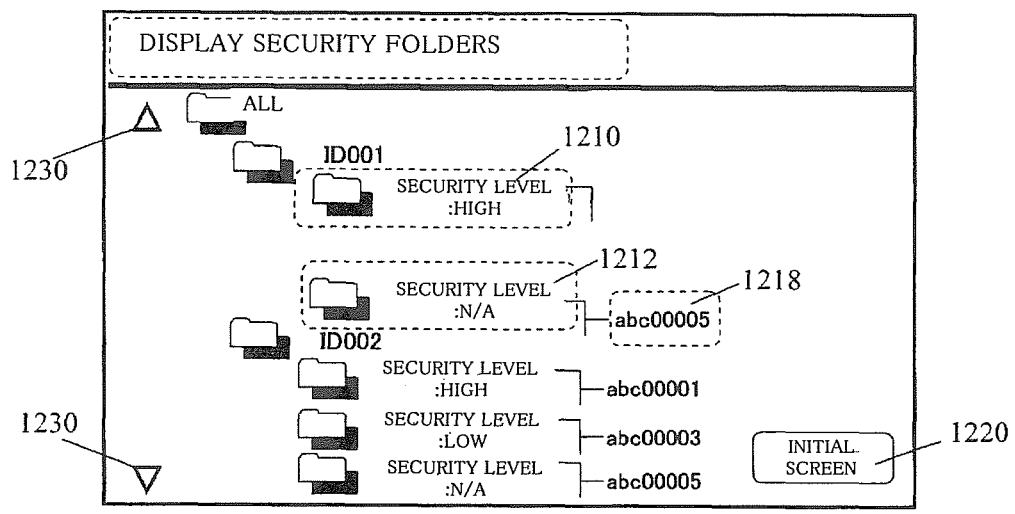
FIG. 12B is a diagram illustrating the screen displayed on the operation unit of the image forming apparatus according to the embodiment.

For example, FIG. 12B illustrates how the security folder screen 1200 is displayed in a case where the room entering/leaving item 1120 associated with a user ID (for example, "ID001") is "Left" with "Security level: High" (corresponding to a case where the image data with "Security level: High" has been transmitted to the server). The image data corresponding to the image data number item 1141 stored in the folder with "Security level: High" among the subfolders of the "ID001" folders illustrated in FIG. 12A is not displayed in FIG. 12B. This indicates that the image data has been transmitted to the server and is not stored in the first image data storage unit 540.

Then, the display control unit 515 performs the above-mentioned determination for all the user IDs (if YES in S205→S206 of FIG. 7).

(Others)

There is a possibility that the user who has left the area in which the multifunction peripheral 100 is installed may return soon. In consideration thereof, the image forming system 10 may employ the following configuration. That is, after a predetermined time has passed since the first communication unit 520 of the multifunction peripheral 100 receives the user's room leaving information from the room entering/leaving information management device 20, the first transmission image data acquisition unit 521 acquires the image data associated with the user identification information within the user's room leaving information of the image data stored in the first image data storage unit 540. Then, the first communication unit 520 saves the image data to the server 560. The above-mentioned predetermined time can be set by the multifunction peripheral 100. Note that approximately 30 minutes is a preferable period of time.

Further, this embodiment employs a configuration such that one user ID is associated with the image data. In contrast, a plurality of user IDs may be associated with the image data, and if all the users having the plurality of user IDs different from one another have left the area in which the multifunction peripheral 100 is installed, the first communication unit 520 may save the image data to the server 560.

In this case, when the second communication unit 565 of the server 560 receives the user's room entering information of anyone among the plurality of users from the room entering/leaving information management device, the second transmission image data acquisition unit 570 of the server 560 acquires the image data associated with the user identification information of the user who has entered the area from within the image data stored in the second image data storage unit 590 of the server 560. Then, the second communication unit 565 of the server 560 transfers the image data to the multifunction peripheral 100.

Accordingly, it is also possible to fully protect secret information of which management is to be shared by the above-mentioned plurality of users with respect to a third party.

The present invention is not limited to the above-described embodiment, and includes various modifications that can be easily conceived by those skilled in the art, without departing from the scope of the claims.

What is claimed is:

1. An image forming apparatus, comprising:
 a first communication unit that allows a connection to a server via a network;
 a first image data storage unit that stores user identification information and image data in association with each other, wherein the image data relates to a document associated with the image forming apparatus;
 a first transmission image data acquisition unit that
 (a) acquires, upon reception of a leaving signal regarding a specific user from an entering/leaving information management device that manages entering/leaving of a user with respect to an area in which the image forming apparatus is installed, the image data, the image data stored before the reception of the leaving signal in the first image data storage unit and having a security level equal to or higher than a first predetermined level associated with the user identification information of the specific user from the first image data storage unit; and
 (b) saves the acquired image data to the server via the first communication unit, when the security level is equal to or higher than a first predetermined level;
 an image data erasing unit that erases, after the first transmission image data acquisition unit saves the acquired image data to the server, the saved image data from the first image data storage unit; and
 a first image data registration unit that stores, when the server receives an entering signal regarding the specific user from the entering/leaving information management device, the image data associated with the user identification information of the specific user received from the server via the first communication unit, in the first image data storage unit.

2. The image forming apparatus according to claim 1, wherein:
 the first image data storage unit stores the image data in association with information on one of an entering and leaving of the user; and
 the image forming apparatus further comprises:
 a display reception unit that receives a display instruction for the image data stored in the first image data storage unit; and
 a display control unit that controls the display reception unit to inhibit displaying of the image data having a security level equal to or lower than a second predetermined level associated with the information on the leaving within the image data stored in the first image data storage unit.

3. The image forming apparatus according to claim 1, wherein after a predetermined time has passed since reception of the leaving signal regarding the specific user, the first transmission image data acquisition unit acquires the image data having a security level equal to or higher than the first predetermined level associated with the user identification information of the specific user from the first image data storage unit, and saves the acquired image data to the server via the first communication unit.

4. The image forming apparatus according to claim 1, wherein:
 the first image data storage unit stores the image data in association with the user identification information of a plurality of users;

when the leaving signals regarding the plurality of users are received from the entering/leaving information management device, the first transmission image data acquisition unit acquires the image data having a security level equal to or higher than the first predetermined level associated with the user identification information of the plurality of users from the first image data storage unit, and saves the acquired image data to the server via the first communication unit; and when the server receives the entering signal regarding at least one of the plurality of users from the entering/leaving information management device, the first image data registration unit stores in the first image data storage unit the image data associated with the user identification information of the plurality of users received from the server via the first communication unit.

5. The image forming apparatus according to claim 2, wherein:

the first image data storage unit stores the image data in association with the information on one of the entering and the leaving of the user; and the image forming apparatus further comprises:

the display reception unit that receives the display instruction for the image data stored in the first image data storage unit; and the display control unit that controls the display reception unit that displays the image data having no security level within the image data stored in the first image data storage unit.

6. The image forming apparatus according to claim 2, wherein after a predetermined time has passed since reception of the leaving signal regarding the specific user, the first transmission image data acquisition unit acquires the image data having the security level equal to or higher than the first predetermined level associated with the user identification information of the specific user from the first image data storage unit, and saves the acquired image data to the server via the first communication unit.

7. The image forming apparatus according to claim 2, wherein:

the first image data storage unit stores the image data in association with the user identification information of a plurality of users;

when the leaving signals regarding the plurality of users are received from the entering/leaving information management device, the first transmission image data acquisition unit acquires the image data having the security level equal to or higher than the first predetermined level associated with the user identification information of the plurality of users from the first image data storage unit, and saves the acquired image data to the server via the first communication unit; and when the server receives the entering signal regarding at least one of the plurality of users from the entering/leaving information management device, the first image data registration unit stores in the first image data storage unit the image data associated with the user identification information of the plurality of users received from the server via the first communication unit.

8. The image forming apparatus according to claim 5, wherein after a predetermined time has passed since reception of the leaving signal regarding the specific user, the first transmission image data acquisition unit acquires the image data having the security level equal to or higher than the first predetermined level associated with the user identification information of the specific user from the first image data storage unit, and saves the acquired image data to the server via the first communication unit.

9. The image forming apparatus according to claim 6, wherein:

the first image data storage unit stores the image data in association with the user identification information of a plurality of users;

when the leaving signals regarding the plurality of users are received from the entering/leaving information management device, the first transmission image data acquisition unit acquires the image data having the security level equal to or higher than the first predetermined level associated with the user identification information of the plurality of users from the first image data storage unit, and saves the acquired image data to the server via the first communication unit; and when the server receives the entering signal regarding at least one of the plurality of users from the entering/leaving information management device, the first image data registration unit stores in the first image data storage unit the image data associated with the user identification information of the plurality of users received from the server via the first communication unit.

10. The image forming apparatus according to claim 8, wherein:

the first image data storage unit stores the image data in association with the user identification information of a plurality of users;

when the leaving signals regarding the plurality of users are received from the entering/leaving information management device, the first transmission image data acquisition unit acquires the image data having the security level equal to or higher than the first predetermined level associated with the user identification information of the plurality of users from the first image data storage unit, and saves the acquired image data to the server via the first communication unit; and when the server receives the entering signal regarding at least one of the plurality of users from the entering/leaving information management device, the first image data registration unit stores in the first image data storage unit the image data associated with the user identification information of the plurality of users received from the server via the first communication unit.

11. A server, comprising:

a first communication unit that allows a connection to an image forming apparatus via a network;

a first image data storage unit that stores user identification information and image data in association with each other, wherein the image data relates to a document associated with the image forming apparatus;

a first image data registration unit that stores, when the image forming apparatus receives a leaving signal regarding a specific user from an entering/leaving information management device that manages entering/leaving of a user with respect to an area in which the image forming apparatus is installed, the image data, the image data stored before the reception of the leaving signal in the image forming apparatus and having a security level equal to or higher than a first predetermined level associated with the user identification information of the specific user received from the image forming apparatus via the first communication unit, in the second image data storage unit; and a first transmission image data acquisition unit that transfers, upon reception of an entering signal regarding the specific user from the entering/leaving information management device, the image data associated with the user identification information of the specific user to the image forming apparatus via the first communication unit.

12. An image forming system, comprising:
an image forming apparatus;
a server communicably connected to the image forming apparatus via a network; and
an entering/leaving information management device that is communicably connected to the image forming apparatus and the server via the network and manages entering/leaving of a user with respect to an area in which the image forming apparatus is installed, wherein:
the image forming apparatus includes:
a first image data storage unit that stores user identification information and image data in association with each other, wherein the image data relates to a document associated with the image forming apparatus;
a first transmission image data acquisition unit that
(a) acquires, upon reception of a leaving signal regarding a specific user from the entering/leaving information management device, the image data, the image data stored before the reception of the leaving signal in the first image data storage unit and having a security level equal to or higher than a first predetermined level associated with the user identification information of the specific user from the first image data storage unit;
(b) and saves the acquired image data to the server, when the security level is equal to or higher than a first predetermined level;
an image data erasing unit that erases, after the first transmission image data acquisition unit saves the acquired image data to the server, the saved image data from the first image data storage unit; and
a first image data registration unit that stores, when the server receives an entering signal regarding the specific user from the entering/leaving information management device, the image data associated with the user identification information of the specific user received from the server in the first image data storage unit; and
the server includes:
a second image data storage unit that stores the user identification information and the image data in association with each other;
a second image data registration unit that stores the image data having the security level equal to or higher than the first predetermined level associated with the user identification information of the specific user received from the image forming apparatus, in the second image data storage unit; and
a second transmission image data acquisition unit that transfers, upon reception of the entering signal regarding the specific user from the entering/leaving information management device, the image data associated with the user identification information of the specific user to the image forming apparatus.

13. The image forming system according to claim 12, wherein:
the first image data storage unit stores the image data in association with information on one of an entering and leaving of the user; and
the image forming system further comprises:
a display reception unit that receives a display instruction for the image data stored in the first image data storage unit; and
a display control unit that controls the display reception unit to inhibit displaying of the image data having a security level equal to or lower than a second predetermined level associated with the information on the leaving within the image data stored in the first image data storage unit.

14. The image forming system according to claim 12, wherein:
the first image data storage unit stores the image data in association with information on one of entering and leaving of the user; and
the image forming system further comprises:
a display reception unit that receives a display instruction for the image data stored in the first image data storage unit; and
a display control unit that controls the display reception unit that displays the image data having no security level within the image data stored in the first image data storage unit.

15. The image forming system according to claim 12, wherein after a predetermined time has passed since reception of the leaving signal regarding the specific user, the first transmission image data acquisition unit acquires the image data having the security level equal to or higher than the first predetermined level associated with the user identification information on the specific user from the first image data storage unit, and saves the acquired image data to the server via the first communication unit.

16. The image forming system according to claim 12, wherein:
the first image data storage unit stores the image data in association with the user identification information of a plurality of users;
when the leaving signals regarding the plurality of users are received from the entering/leaving information management device, the first transmission image data acquisition unit acquires the image data having the security level equal to or higher than the first predetermined level associated with the user identification information of the plurality of users from the first image data storage unit, and saves the acquired image data to the server via the first communication unit; and
when the server receives the entering signal regarding at least one of the plurality of users from the entering/leaving information management device, the first image data registration unit stores in the first image data storage unit the image data associated with the user identification information of the plurality of users received from the server via the first communication unit.

17. The image forming system according to claim 16, wherein:
the first image data storage unit stores the image data in association with information on one of an entering and leaving of the user; and
the image forming system further comprises:
a display reception unit that receives a display instruction for the image data stored in the first image data storage unit; and
a display control unit that controls the display reception unit to inhibit displaying of the image data having a security level equal to or lower than a second predetermined level associated with the information on the leaving within the image data stored in the first image data storage unit.

18. The image forming system according to claim 17, wherein the display control unit controls the display reception unit to display the image data having no security level within the image data stored in the first image data storage unit.

19. The image forming system according to claim 18, wherein after a predetermined time has passed since reception of the leaving signal regarding the specific user, the first transmission image data acquisition unit acquires the image data having the security level equal to or higher than the first predetermined level associated with the user identification information on the specific user from the first image data storage unit, and saves the acquired image data to the server via the first communication unit.

20. The image forming system according to claim 18, wherein the image forming apparatus comprises at least one of a printer, a copier, a scanner, and a fax machine.

* * * * *